3,045,233
FREQUENCY MODULATION RADIO ALTIMETER

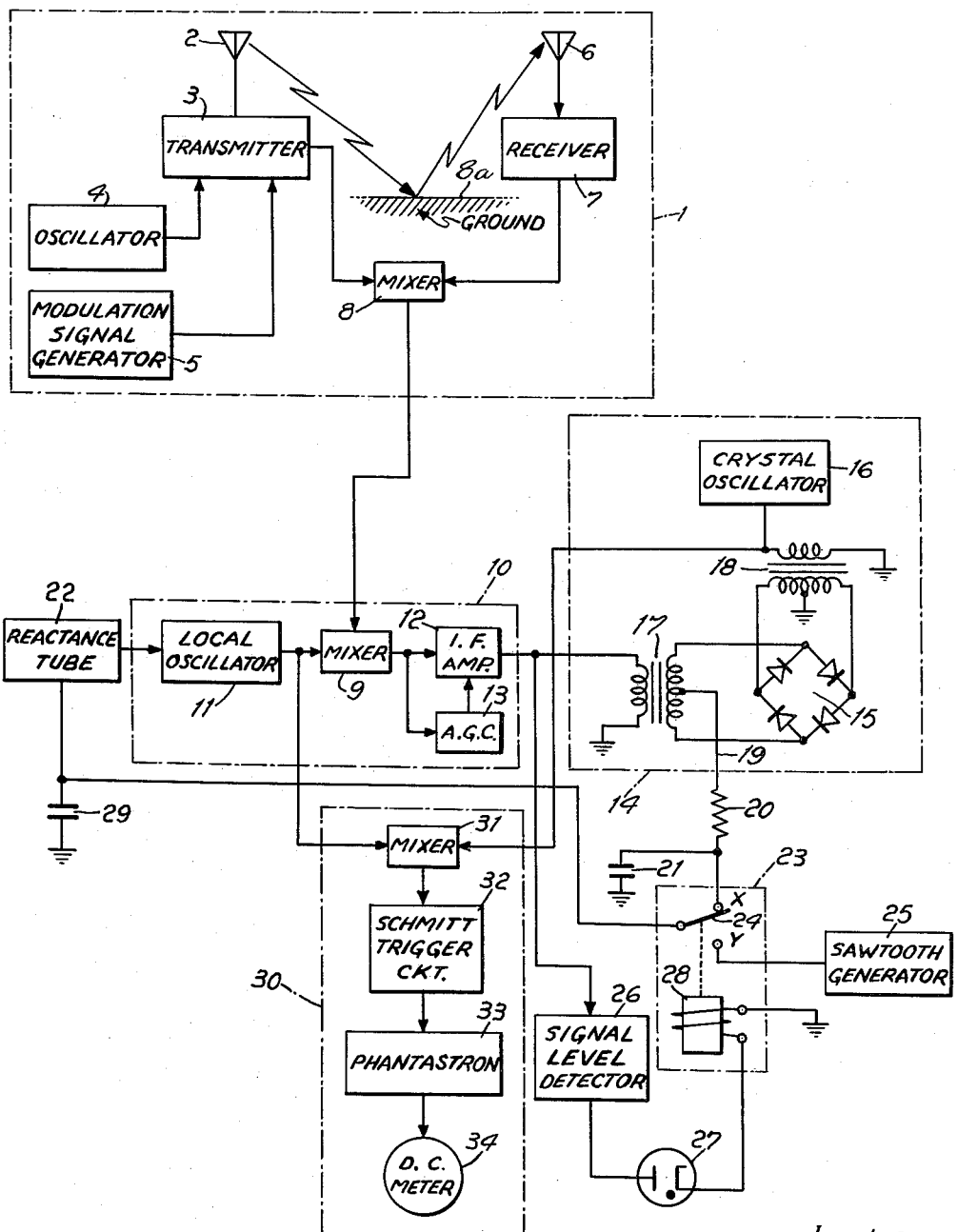

Arthur J. Katz, Wayne, and Robert T. Adams, Short Hills, N.J., assignors to International Telephone and Telegraph Corporation, Nutley, N.J., a corporation of Maryland
Filed Jan. 21, 1958, Ser. No. 710,206
8 Claims. (Cl. 343—14)

This invention relates to distance measuring systems such as radio altimeters and particularly to radio altimeters used over a range of altitudes including close proximity to the ground in which reflected signal are frequency searched to enable the receiver of said radio altimeter to lock on to and track a given reflected signal and reject spurious reflected signals as the absolute altitude varies.

In some prior frequency modulation radio altimeter systems employed to measure a range of altitudes, frequency tracking circuits have been used which cause the modulation rate of the frequency modulated signals transmitted to be changed as a function of the altitude measured so that the frequency difference between the transmitter signal at a given instant and the frequency of the received signal at the same instant, also called beat signal, is maintained constant. In such prior systems the modulation rate is indicative of the absolute altitude.

Other similar prior systems have included frequency search circuits to cause the modulating frequency to continuously change or sweep over a relatively wide band of frequencies preventing what is known as altimeter lockout. Altimeter lockout occurs when the beat signal is too far outside the frequency band of the beat frequency amplifier to be detected by that amplifier, so that the altimeter is not responsive to the particular signal frequency which is indicative of altitude and may lock on to a spurious or stronger signal yielding an improper indication of altitude.

An object of this invention is to provide an improved radio distance measuring system having a fixed transmitted frequency modulation rate and which is capable of locking on to and tracking a reflected radio signal, rejecting other reflected signals and noise, over a range of altitudes including close proximity to the ground.

It is a feature of this invention to provide radio transmitting means responsive to a fixed oscillator and a fixed modulating signal generator which generates a symmetrical waveform and to provide means to mix the instantaneously transmitted signal with the instantaneously received signal producing a beat frequency, means to feed that beat frequency which is indicative of absolute altitude to the mixer of a heterodyne receiver, and means responsive to the output of said heterodyne receiver to apply frequency control signals causing the local oscillator of that receiver to search for, lock on to, and track said beat frequency signal indicative of absolute altitude.

It is a further feature of this invention to frequency sweep said local oscillator with pulses from a sweep waveform generator during the search phase, to establish lock-on by energizing switching means when the output of the IF amplifier of said heterodyne receiver which is responsive to a narrow band of frequencies reaches a given level, said switching means thereafter applying the output of automatic phase control means to said local oscillator maintaining the IF frequency of said heterodyne receiver constant and to indicate absolute altitude by means of frequency counting means coupled to the output of said local oscillator.

Other and further objects and features of this invention will be apparent from the following specific description of an embodiment of this invention and from the FIGURE which represents a block diagram and schematic of a frequency modulation radio altimeter having frequency search, lock-on, and tracking means.

Turning to the figure, there is shown a typical frequency modulation radio altimeter transmitter and receiver 1 having means to transmit a frequency modulated signal whose modulation is preferably a symmetrical waveform, said means comprising a transmitting antenna 2, a transmitter 3, fixed frequency oscillator 4, and modulation signal generator 5. Transmitter and receiver 1 also includes a receiving antenna 6 and receiver-amplifier 7. The outputs of transmitter 3 and receiver 7 are fed to mixer 8 wherein is produced a beat frequency indicative of the distance traveled by the transmitted signal from antenna 2 to the ground at 8a and back to the receiving antenna 6 and thus indicative of the distance from the transmitting and receiving antennas 2 and 6 to the ground at 8a.

The output of mixer 8, whose frequency range may be, for example, 10 to 100 kc. and representative of absolute altitudes from 0 to 5,000 feet, is fed to the mixer 9 of heterodyne receiver 10 where it is mixed with the frequency signal from controlled local oscillator 11 of heterodyne receiver 10. The uncontrolled frequency of controlled local oscillator 11 may be about 2 megacycles and is preferably 2.055 megacycles so that relatively small changes in its frequency output are required to tune the heterodyne receiver 10 to the output signal from mixer 8 to produce a fixed IF frequency of 2.000 megacycles. The output of mixer 9 is fed to IF amplifier 12 having automatic gain control 13 which may be similar to any one of many types of automatic gain control circuits. The output of IF amplifier 12 which is responsive to a very narrow band of frequencies, preferably less than 10 kc. wide and centered at 2.000 megacycles, is fed to phase sensitive network 14, which is preferably a balanced modulator type comprised of a diode bridge 15 coupled to the output of IF amplifier 12 and the output of a crystal oscillator 16 via transformers 17 and 18, respectively. Crystal oscillator 16 produces a fixed frequency signal equal to the desired IF frequency of 2.000 megacycles, so that center tap line 19 on transformer 17 is at 0 voltage when the output of IF amplifier 12 is 90 degrees out of phase with the output of crystal oscillator 16. If the output of IF amplifier 12 is at a higher frequency than crystal oscillator 16, a pulsating D.C. voltage of one polarity will be applied to center tap line 19 and if it is at a lower frequency, a pulsating D.C. voltage of opposite polarity will be applied to line 19. This pulsating D.C. voltage is integrated by resistor 20 and capacitor 21, to smooth the pulses, and applied to reactance tube 22 when relay switch 23 is not energized. Relay switch 23 is not energized when the system is in the track phase and thus arm 24 of that switch is at terminal X. The output of reactance tube 22 is coupled to the tuning circuit of local oscillator 11 thereby controlling that oscillator's frequency output to produce the desired IF frequency which is equal to the frequency of crystal oscillator 16 and is 90 degrees out of phase with it.

If the IF frequency from IF amplifier 12 is equal to the frequency of crystal oscillator 16 but is not in quadrature with it, a D.C. signal will still be applied to reactance tube 22 in the same fashion as described above to control the frequency of local oscillator 11 thus maintaining IF frequency equal to the frequency of crystal oscillator 16. Therefore, a frequency control voltage will be applied to reactance tube 22 to maintain the frequency of local oscillator 11 at the proper value to produce the IF frequency of 2.000 megacycles even when that desired IF frequency is obtained. Such a condition would not be achieved with ordinary AFC employing an S-type discriminator to control reactance tube 22. In ordinary AFC the IF frequency would necessarily have to be slightly in error to produce a required D.C. level to control reactance tube 22 and thereby maintain the local oscillator frequency at the desired value. Such an error would appear as an error in the indicated altitude.

When relay switch 23 is not energized, the system is in the track phase described above, and when this relay is energized, saw-tooth pulses from saw-tooth generator 25 are applied via terminal Y to arm 24 of that switch and thence to reactance tube 22 causing the frequency output of local oscillator 11 to continuously vary over a range of frequencies preferably about 100 kc. wide. Relay switch 23, which is shown in the deenergized or track position, is energized by the output of the signal level detector circuit 26 which is coupled to the output of IF amplifier 12 and applies a voltage to hot cathode gas diode 27. Circuit 26 may consist of an amplifier and rectifier. When the output of signal level detector circuit 26 exceeds a given voltage level which may be, for example, +15 volts, diode 27 conducts, energizing solenoid 28 of relay switch 23 and thus causing the system to search as described above and when this output falls below +15 volts diode 27 will cease conducting thereby deenergizing relay switch 23. Capacitor 29 is provided so that when relay switch 23 is deenergized, causing arm 24 of that switch to move from terminal Y to terminal X, the last voltage impressed on reactance tube 22 from sawtooth sweep generator 25 will be maintained for the brief period it takes for arm 24 to move from terminal X to terminal Y.

During the track condition the frequency output of local oscillator 11 is indicative of altitude. Thus frequency counting circuit 30 is provided and coupled to the output of local oscillator 11 to indicate altitude. Frequency counting circuit 30 is comprised of a mixer 31, which mixes the signal frequencies of local oscillator 11 and fixed crystal oscillator 16 producing a beat frequency ranging between 10 and 100 kc. which is indicative of altitudes between 0 and 5,000 feet. This signal is fed to Schmitt trigger circuit 32 which produces a square wave output of the same frequency as its input frequency. This square wave is fed to phantastron 33 which is triggered by the leading edge or positive rising edge of the square wave signal. Pulses formed by phantastron 33 are of constant width and height as established by the constants of the phantastron circuit, and the rate of these pulses varies directly with the rate of square waves from Schmitt trigger circuit 32, which in turn varies with the frequency output from mixer 31 and, thus, with absolute altitude. Therefore, the pulse output from phantastron 33 may be integrated to yield a signal level proportional to absolute altitude. For this purpose a damped D.C. meter 34 is provided which is energized by the pulses from phantastron 31 and may be calibrated to indicate absolute altitude.

Thus by frequency searching the signal from mixer 8 which contains the frequency indicative of absolute altitude, then locking on to and tracking that frequency by means of APC circuit 14 so that the output of IF amplifier remains within a very narrow band of frequencies preferably only a few kc. wide, spurious frequency signals appearing in the output of mixer 8 are rejected.

While we have described above the principles of our invention in connection with specific apparatus, it is to be clearly understood that this description is made only by way of example and not as a limitation to the scope of our invention as set forth in the objects thereof and in the accompanying claims.

We claim:

1. A distance measuring system comprising means to transmit a frequency modulated signal and means to detect its echo, a mixer coupled to said transmitting means and said detecting means to beat the transmitted and detected signals producing a beat frequency signal indicative of distance, a variable frequency generator, means coupled to said mixer to compare said beat frequency signal with the output from said variable frequency generator to produce a frequency difference signal, means responsive to both the frequency and the phase of said frequency difference signal and to a fixed reference signal to control said variable frequency generator to maintain said frequency difference signal constant and means responsive to the output of said variable frequency generator and said fixed reference signal to indicate distance.

2. A distance measuring system comprising means to transmit a frequency modulated signal and means to detect its echo, a mixer coupled to said transmitting means and to said detecting means to beat the transmitted and detected signals producing a beat frequency signal indicative of distance, a variable frequency generator, means coupled to said mixer to compare said beat frequency signal with the output from said variable frequency generator producing a frequency difference signal, frequency search control means including a fixed frequency oscillator, frequency track control means responsive to both the frequency and the phase of said frequency difference signal, switching means responsive to said frequency difference signal to couple said frequency search control means or said frequency track control means to said variable frequency generator to control the frequency of said generator maintaining said frequency difference signal constant and means responsive to the outputs of said variable frequency generator and said fixed frequency oscillator to indicate distance.

3. A distance measuring system comprising means to transmit a frequency modulated signal and means to detect its echo, a mixer coupled to said transmitting means and said detecting means to beat the transmitted and detected signals producing a beat frequency signal indicative of distance, variable frequency generating means, means coupled to said mixer to compare said beat frequency signal with the output from said variable frequency generating means to produce a frequency difference signal, frequency search control means including a fixed frequency oscillator, frequency tracking control means responsive to changes in both the frequency and the phase of said frequency difference signal, switching means responsive to said frequency difference signal to couple said frequency search control means or said frequency track control means to said variable frequency generator to control the output of said generator so that said frequency difference signal is maintained constant and means responsive to the outputs of said variable frequency generator and said fixed frequency oscillator to indicate distance.

4. A distance measuring system comprising means to transmit a frequency modulated signal and means to detect its echo, a mixer coupled to said transmitting means and said detecting means to beat the transmitted and detected signals producing a beat frequency signal indicative of distance, a controlled oscillator, mixing means coupled to the output of said mixer and the output of said controlled oscillator to produce a frequency difference signal, frequency band detection means coupled to the output of said mixing means, frequency search control means, a fixed frequency generator, phase comparison means coupled to the output of said band detection means and to said fixed frequency generator to compare both the frequency and the phase of said frequency difference signal with both the frequency and phase of the signal from said fixed frequency generator, switching means responsive to the output of said frequency band detection means to couple the output of said frequency search control means or the output of said phase and frequency comparison means to said controlled oscillator to maintain said frequency difference signal constant as distance changes and distance indicating means coupled to the outputs of said controlled oscillator and said fixed frequency generator.

5. A distance measuring system comprising means to transmit a frequency modulated signal and means to detect its echo, means coupled to said transmitting means and to said detecting means to beat the transmitted and detected signals producing a beat frequency signal indicative of distance, heterodyning means coupled to the output of said means to beat, tuning means coupled to said heterodyning means, frequency and phase comparison means coupled to the output of said heterodyning means and to a fixed frequency oscillator, sweep pulse generating means, switching means responsive to the output of said heterodyning means to apply the output of said sweep pulse generating means or the output of said phase and frequency comparison means to said tuning means to tune said heterodyning means so that its intermediate frequency is constant, frequency measuring means coupled to the outputs of the local oscillator of said heterodyning means and said fixed frequency oscillator and means to indicate absolute altitude coupled to said frequency measuring means.

6. A radio altimeter comprising means to transmit a frequency modulated signal and means to detect its echo, mixing means coupled to said transmitting means and detecting means to produce a frequency difference signal whose frequency is indicative of absolute altitude, heterodyning means coupled to the output of said mixing means and having automatic phase and frequency control means comprising a phase and frequency comparator and a fixed frequency oscillator, external means to vary the tuning of said heterodyning means, means responsive to the output of said heterodyning means to apply said external tuning means to vary the tuning or to apply said automatic phase control means to control the tuning of said heterodyning means so that the intermediate frequency of said heterodyning means is maintained constant, frequency measuring means coupled to the outputs of the local oscillator of said heterodyning means and said fixed frequency oscillator and means to indicate absolute altitude coupled to said frequency measuring means.

7. A radio altimeter comprising means to transmit a frequency modulated signal and means to detect its echo, signal mixing means coupled to said transmitting means and said detecting means to produce a frequency difference signal whose frequency is indicative of absolute altitude, heterodyning means coupled to the output of said mixing means and having automatic phase and frequency control to maintain its intermediate frequency constant, said automatic phase and frequency control including a fixed frequency oscillator external means to control the tuning of said heterodyning means, switching means responsive to the intermediate frequency of said heterodyning means to apply said automatic phase and frequency control or said external tuning means to tune said heterodyning means, and altitude indicating means coupled to the local oscillator of said heterodyning means and said fixed frequency oscillator.

8. A radio altimeter comprising means to transmit a frequency modulated signal and means to detect its reflection from the ground, a first mixing means coupled to said transmitting means and to said detecting means producing a frequency difference signal between said transmitted and said reflected signals, means coupling the output of said mixer to the mixer of a heterodyne receiver having automatic gain control and having automatic phase and frequency control comprising a reactance circuit coupled to the local oscillator of said heterodyne receiver, a phase and frequency comparison circuit and a fixed frequency oscillator, saw tooth pulse generating means, switching means coupling said saw tooth pulses or the output of said automatic phase control to said reactance circuit to control the frequency of said local oscillator to tune said heterodyne receiver, means coupling the output of the intermediate frequency amplifier of said heterodyne receiver to said switching means to control said switching means, frequency measuring means coupled to the outputs of said local oscillator and said fixed frequency oscillator comprising a mixer, square wave generator and phantastron circuit yielding a D.C. signal level indicative of altitude, and altitude indicating means coupled to the output of said phantastron circuit.

References Cited in the file of this patent

UNITED STATES PATENTS

| | | |
|---|---|---|
| 2,011,392 | Bentley | Aug. 13, 1935 |
| 2,371,988 | Granqvish | Mar. 20, 1945 |
| 2,405,134 | Brown et al. | Aug. 6, 1946 |
| 2,423,088 | Earp | July 1, 1947 |
| 2,537,593 | Landon et al. | Jan. 9, 1951 |
| 2,726,383 | Dunn | Dec. 6, 1955 |
| 2,776,426 | Altman | Jan. 1, 1957 |